United States Patent [19]

Gross

[11] Patent Number: 4,554,888
[45] Date of Patent: Nov. 26, 1985

[54] COMPACT ANIMAL FEEDER TROUGH

[76] Inventor: Tony H. Gross, Rte. 1, Box 40, Hawley, Minn. 56549

[21] Appl. No.: 591,927

[22] Filed: Mar. 21, 1984

[51] Int. Cl.[4] ............................................. A01K 5/00
[52] U.S. Cl. ...................................................... 119/53
[58] Field of Search .............. 119/52 R, 52 AF, 52 B, 119/53, 57

[56] References Cited

U.S. PATENT DOCUMENTS

| | | | |
|---|---|---|---|
| 2,457,432 | 12/1948 | Ballard | 119/53 |
| 2,571,637 | 10/1951 | Weist | 119/52 B |
| 3,267,904 | 8/1966 | Biehl | 119/63 |
| 4,216,742 | 8/1980 | Kirchhofer | 119/53 X |

FOREIGN PATENT DOCUMENTS

| | | | |
|---|---|---|---|
| 745450 | 7/1980 | U.S.S.R. | 119/52 AF |

Primary Examiner—Robert P. Swiatek
Attorney, Agent, or Firm—Harry J. Watson

[57] ABSTRACT

A compact animal feeder having a tubular housing with paired feed access openings spaced side-by-side in the sidewall. The feed access openings are located upwardly on the sidewall so that a rounded bottom portion of the tubular sidewall forms a trough which tends to hold feed centrally in a chamber formed within the housing. A feed delivery tube enters from above through another opening in the housing and extends downwardly between each pair of feed access openings to a point above the rounded trough bottom. An adjustable gap permits a given amount of feed to pile up below the feed supply tube. The feed pile automatically stops further flow. Multiple animal feeding is possible from a location at the side of a pen. Oppositely paired feed access openings can be used to permit installation between pens.

10 Claims, 5 Drawing Figures

U.S. Patent
Nov. 26, 1985
4,554,888
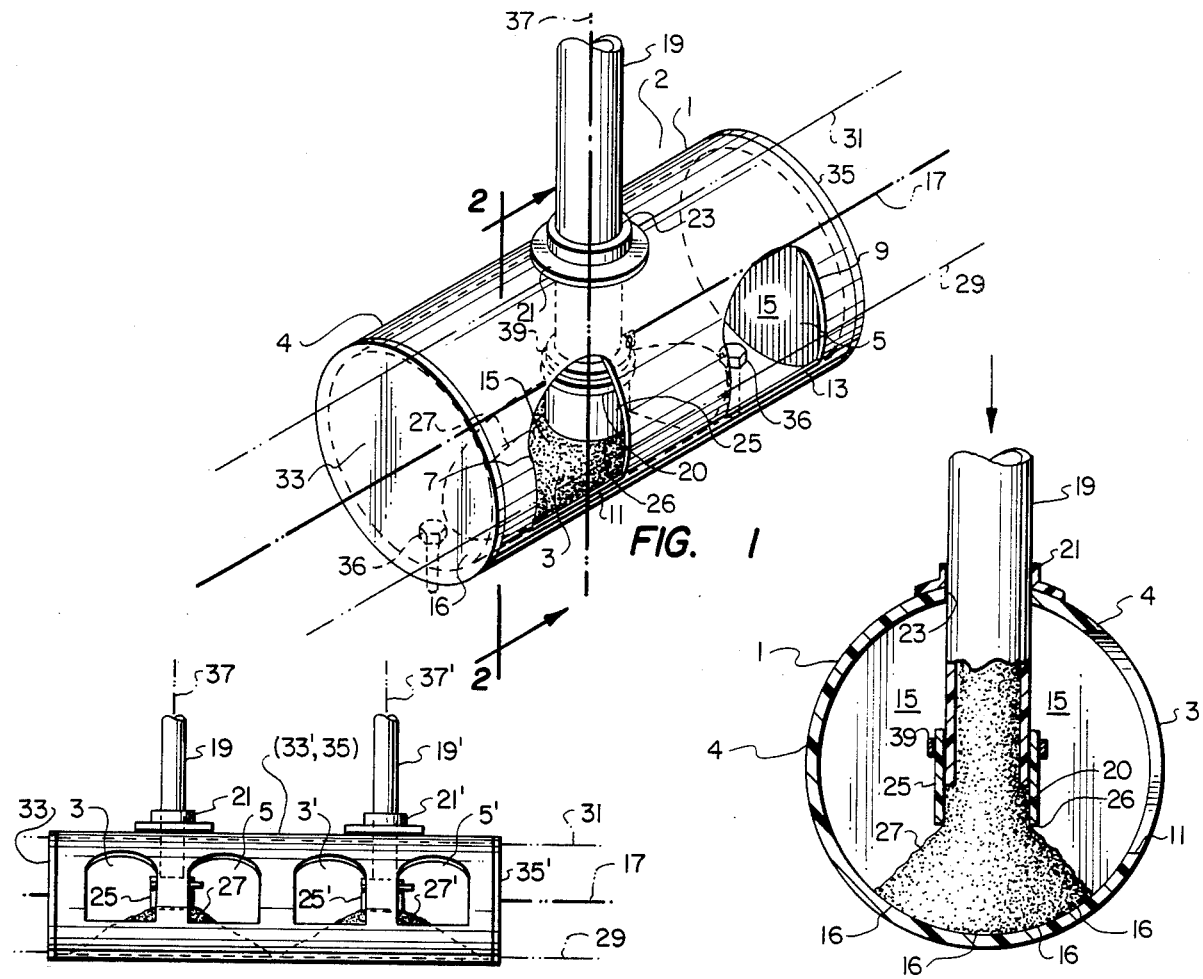

4,554,888

COMPACT ANIMAL FEEDER TROUGH

BACKGROUND OF THE INVENTION

1. Field of the Invention:

This invention relates generally to multiple animal feeders, and more specifically to a compact self-limiting feeder suitable for space saving installation along the side or between animal pens.

2. Description of the prior art:

Animals are commonly raised through most or all of their life in pens. This is particularly true of pigs. Groups of animals of a common size or age or of particular ancestry are kept together in individual holding and feeding pens. The pens along with abutting or adjacent pens are usually enclosed in a confinement building in order to control the environment. The economics require that the number of animals in a given amount of space in each pen be maximized.

Nevertheless, each feeding operation establishes a maximum number of animals in a unit of space or in a pen of a given size because overcrowding becomes counterproductive for a variety of reasons and can lead to sickness, unhealthy animals and reduced feeding efficiency. Therefore use of the available square foot floor surface area is at a premium for an efficient feeding operation. A compact feeding apparatus is desirable to avoid excessive use of the available floor space.

In addition to the space consideration it is important in a modern animal feeding operation to reach market weight with the minimum total consumption of feed. Feed is probably the most expensive single element of cost in a market feeding operation. Therefore it is important to obtain maximum feeding efficiency and to avoid wastage or spoilage of feed. Many animal feed pens, particularly for pigs, do not have solid floors but rather have grates or slats which permit animal waste to be conveniently removed from the enclosure. Therefore in such systems it is important to avoid spillage of feed on the floor of the pen because it simply passes through the floor along with the waste and is lost.

Additionally many operators believe that the overall feeding efficiency is improved if the feed is not allowed to become stale by exposure to the animal environment which causes feed to become contaminated with barn odors by such exposure over a period of time and can lead to spoilage. Spoiled feed can also create health problems in the feeding pigs.

A typical animal feeder is built in the shape of the letter "L" when viewed from the end. The upright section constitutes a hopper which holds a large quantity of feed. The hopper is mounted on a base which has a large flat area that extends out horizontally on one or both sides to provide room for a number of feeding stations. A manually operated gate can be raised or lowered and fixed in position between the hopper portion of the feeder and the horizontally extended base. Raising the gate to an intermediate position above the bottom of the base provides a gap through which feed can come down from the hopper and outwardly under the gate into the extended portion of the base for access to the feeding stations. A wire loop agitator for each feeding station extends from the hopper under the gate into each horizontally extending feeding station. The agitator is intended to facilitate flow of fresh feed by mechanical agitation caused by the feeding movements of the animals.

Other conventional feeders of a similar nature are round having a central feed storage compartment with multiple feed stations around the circumference of an extended lower flat bottomed base. This configuration necessitates placement of the feeder in the center of the pen in order to provide access for multiple animal feeding. Both of the feeders just described require large base areas for stability which tends to reduce the number of animals which can be fed in a given pen size.

The conventional feeders also have a fairly large open area at each feeding station which, particularly in the case of rooting animals like pigs, allows the feed to be thrown out onto the floor area during feeding which causes loss. The flat floor area of the base of the typical feeders has inaccessible corners which accumulate feed that spoils fast particularly where moisture is present.

Moisture from the mouth and nose of the feeding animals also clogs the feeder gates and eventually in spite of the wire loop agitators causes bridging of feed and provides an insufficient supply of food which necessitates frequent cleaning and readjustment in order to reestablish satisfactory feeding conditions. This situation aggravates the problems of feed spoilage and wastage and pick up of barn odors because the natural tendency of the operators is to use a higher gate setting in order to avoid the clogging with the result that an excessive amount of feed is allowed to pass into and be held in the feeding station areas.

SUMMARY OF THE INVENTION

The invention is a structure which provides multiple openings for simultaneous feeding of animals in a linear arrangement. The unit is designed to be durable yet inexpensive because it is made from readily available common construction materials. The housing is a hollow tubular structure with a uniform wall thickness and a length generally greater than the diameter. The feeder will be described with its long dimension or cylinder axis lying horizontally with respect to the floor of an animal holding and feeding pen.

The sidewall of the housing has at least two feed access openings constituting feeding ports which are separated from each other adjacently along the cylinder axis by a portion of the wall such that the area of each opening constitutes a feeding station for an individual animal. The ends of the cylinder are closed and the cylinder walls together with the ends form a chamber that will contain and hold feed.

The housing has an opening in its wall at the top which is centered over the chamber and it is located with respect to each pair of feed access openings so that a tube passing outwardly and inwardly from the top opening of the housing is on a line that intersects the cylindrical center axis of the housing and is midway between the pair of feed access openings. Looking from the side the feed access openings are seen as symmetrically arranged both vertically and horizontally from the vertical line.

A feed delivery tube in a vertical orientation on the line is extended downwardly from a feed supply source directly toward the center of the enclosure and below the center line of the enclosure to a point above the bottom of the housing. A gap remains between the bottom most end of the delivery tube and the bottom of the housing. The delivery tube is fastened to the housing and has an adjustable sleeve on its bottom end which may be adjusted to vary the amount of the gap between the end of the adjustable sleeve and the bottom of the housing between the feed access openings.

The feed access openings are located high enough up on the sidewall of the housing so that the bottom edge of the perimeter of the openings is located above the bottom of the housing so that the rounded bottom of the housing forms a trough which retains feed and tends to cause feed to concentrate in the bottom center of the trough.

When feed from a supply source is introduced into the top of the feed delivery tube the individual granulated feed particles fall through the delivery tube into the chamber and build up in the trough into a cone shaped pile of feed which flows outwardly in all directions within the enclosure. If the cone shaped pile of feed is undisturbed it builds up until the outlet opening of the bottom of the delivery tube is reached which causes the further flow of feed to stop.

The pile of feed thus formed becomes accessible to individual animals at each of the feeding stations. When part of the feed is removed, as by an animal eating, new feed falls by gravity to reform the pile. The size of the feed pile in the enclosure can be varied for any given feed characteristics by adjusting a sleeve located at the bottom of the delivery tube, to alter the gap between the bottom of the sleeve and the bottom of the trough in the chamber.

Because the feed access openings are spaced linearly along the side wall of the housing the feeder is especially suited for installation along the side wall of the pen. This along with the compact arrangement of the structure minimizes the space occupied by the feeder in comparison with conventional feeders and thus permits a greater number of animals to be properly housed in a given size pen.

A housing having two feed access openings with a feed delivery tube disposed therebetween as described above constitutes a basic unit. The basic unit may be replicated along the horizontal central axis of the cylinder to provide a line of pairs of feed access openings, each pair having associated therebetween a feed delivery tube. Each feed delivery tube can provide a cone shaped pile of feed in the chamber, part of which is accessible to individual animals at each feed access port.

The invention also can be installed at the common side of adjacent animal pens to serve as a two sided feeder. In this case a duplicate set of feed access openings in the housing is supplied which are directly opposite. They are in a mirror image relationship to each other about a vertical plane through the center of the cylindrical housing. A partition centered linearly in the chamber in the vertical plane having a lower portion somewhat above the center line of the chamber and about as wide as the width of the feed access openings is added to the feeder if it is used to serve as a fence line feeder between adjacent pens.

The partition serves to obstruct the vision and to prevent biting and fighting between two individual animals feeding from two different adjacent pens at access openings which are directly opposite each other. A feeder located in the fence line between two adjacent pens in this manner further minimizes the use of floor space and reduces almost in half the total number of feeders required for a matrix of pens of a given size.

The feeder may be supported by brackets in the fence line itself or it may be mounted at or near the floor with the fence adjacent to it to provide the separation for the two pens. Thus the feeder may be constructed as a single side feeder in which it is utilized by animals in only one pen or it may be constructed as a dual or two side feeder and placed at the fence line for use by animals on either side.

The delivery tube which extends below the center line of the chamber in addition to its function as a means of introducing feed into the chamber and through its sleeve to control the feed, also serves as a barrier between animals feeding side by side from adjacent feed access ports of a pair which it serves. This prevents the animals feeding from the same feed pile from physically contacting each other.

Thus it is an object of this invention to provide a compact multi-animal feeder with a reduced space requirement to maximize the number of animals that can be successfully raised in a given sized pen.

It is an object of this invention to provide a feeder which when connected to a feed source automatically limits the amount of feed that enters the feeder, freely and readily provides additional feed from the source to replace feed which is eaten, and does so without moving parts.

Another object is to prevent unused feed waste and spoilage by providing a rounded trough in a chamber, which has no dead areas in which uneaten feed can accumulate and spoil so as to aid in maintaining animal health, and in preventing loss of feed from the chamber.

It is a further object of the invention to physically restrict adjacently or oppositely feeding animals from contact with each other to prevent biting and fighting among them when they are attempting to feed.

Another object of the invention is to keep the feed fresh and free from barn odors or contamination by limiting the amount of feed that is exposed to the environment at any given time.

An object of the invention is to provide a feeder for animals which is light weight and non-corrosive but sturdy enough for large animals.

An additional object of the invention is to provide a multiple animal feeder which is cheaper to manufacture and sell because it is made from common inexpensive mass produced construction materials.

BRIEF DESCRIPTION OF THE DRAWINGS

FIG. 1 is a perspective basic unit view showing an enclosure with a pair of access ports and a single delivery tube for feed.

FIG. 2 is section 2—2 of FIG. 1 illustrating the construction and location of the feed delivery tube.

FIG. 3 is a double unit front elevation with two pairs of feed access ports and a feed delivery tube for each of the pairs of ports.

FIG. 4 is a basic unit plan view with front and rear access openings paired oppositely in mirror image relationship constituting two pairs of oppositely disposed feeding stations around a feed delivery tube.

FIG. 5 is a cut away front elevation of a basic unit of FIG. 4 on section 5—5 to better show the partitions.

DETAILED DESCRIPTION

The animal feeder has a hollow tubular housing 1 which has a uniform wall thickness. The housing 1 is in the shape of a hollow cylinder which has a longitudinal central axis 17 and a length along this axis greater than the diameter of the housing. A basic unit designated generally as 2 will be described as shown in FIG. 1. It will be described as the feeder is oriented for use with the central axis disposed parallel and horizontal with respect to the ground or the floor of an animal holding and feeding pen. The basic unit 2 as shown in FIG. 1 is a perspective view which is viewed looking downwardly at the front side of a feeder unit.

In FIG. 1 the housing has a first feed access opening 3 and a second feed access opening 5. These feed access openings constitute feeding ports which are identical in size and shape and are large enough to accommodate passage of the head of the largest animal that is expected to utilize the feeder. The feeder may be conveniently thought of as a cylindrical section cut out of a large diameter pipe with openings in the wall of the cylinder. The wall 4 of the cylinder is continuous in nature as illustrated in FIG. 2 which is a section through the line 2—2 of the housing 1 that is shown in FIG. 1.

The perimeter 7 of the first feeding port 3 and the perimeter 9 of the second feeding port 5 are shown in FIG. 1. A bottom edge 11 of the perimeter of the port 3 and a bottom edge 13 of the perimeter of the port 5 are formed in the wall 4 of the housing 1 and constitute a lower most portion of the perimeters of the respective feeding ports 3 and 5. The edge 11 and the edge 13 are located a common distance above the lower most portion of the housing 1. The volume in the housing below the level of the edges 11 and 13 and defined by the rounded housing bottom wall constitutes a rounded trough which is illustrated as 16 in FIG. 1. It runs along the entire length of the feeder.

A bottom boundary line 29 represents the line of contact of the housing 1 with a horizontal plane or surface. The top line 31 is a boundary line representing the upper most top portion of the wall of the housing 1. These lines are parallel to each other. A vertical plane passing through them also passes through the housing center line 17. Except for the wall thickness the line 29 and the line 31 represent respectively the bottom and top of the interior of the housing.

The housing 1 of the basic unit 2 in FIG. 1 also has a first end 33 and a second end 35 enclosing the ends of the housing 1 and together with the wall 4 enclose a feeding chamber 15 within the housing. The ends 33 and 35 may be thought of as separate pieces fastened to the cylindrical housing or the housing itself may be close ended, but it is preferred that separate pieces be used because it is more economical to make the feeder from a length of large diameter pipe and enclose the end with separate pieces. The outer ends of the chamber 15 should be closed off to prevent animals from attempting to enter the chamber from the end or from disturbing other animals that may be feeding at the feed access ports such as 3 or 5.

The trough portion 16 of the enclosure which is in the chamber 15 is bounded by the interior wall of the chamber and includes all the volume below a horizontal plane through the edges 11 and 13 of the feed ports 3 and 5. The trough 16 is thus capable of holding feed within the chamber to the level of the edges 11 and 13 and it will be seen that it is rounded concave upwardly. The rounded nature of the trough serves an important function by tending to concentrate any food in the chamber 15 toward the bottom center of the trough 16. The bottom center of the trough is one wall thickness above the line 29.

The housing 1 also has an opening at its top center position centered on a vertical axis 37 which intersects the horizontal axis 17 at the center of the chamber 15. The opening 23 is centered longitudinally between the feed access ports 3 and 5.

A feed delivery tube 19 passes vertically through the opening 23 and extends downwardly to a level below the center of the chamber 15 midway between the feed access openings. It does not extend all the way to the floor of the chamber 15 but is mounted fixedly to the housing 1 by brackets 21 at a point which leaves its lower most portion above the floor of the chamber a spaced distance. The lower end of the tube has an outlet 20.

The delivery tube 19 is extended upwardly to interconnect with a supply of particulated feed which may be supplied from a separate isolated hopper or from a transport tube or auger coming from a centralized conventional hopper. In either case supplied feed falls by gravity down through the delivery tube and thus enters the chamber 15. The lower most end of the delivery tube 19 has mounted on it an adjustable sleeve 25 which is best seen in FIG. 2 which shows the section 2—2 of FIG. 1. The sleeve 25 is a short portion of a split tube which is mounted on the lower most end of the delivery tube 19 and may be raised or lowered along the axis 37 to a desired elevation above the trough 16. The sleeve 25 has a lower outlet 26. A fastener such as a clamp 39 is used to fix the sleeve 25 in place until further adjustment is desired.

Referring now to FIG. 1, mounting studs 36 are located along the contact line 29 through the housing 1. Sufficient mounting studs or other fasteners are used to securely fix the base in position on a slab or the floor surface of a pen. A stable mounting is desired because rocking motions will undesirably disturb self-limiting feature of the feed pile and allow more feed to accumulate in the trough than the geometry would otherwise allow.

It will be seen by referring to FIG. 1 and FIG. 2 that feed which is introduced through the delivery tube 19 will fall by gravity through the outlet of the tube and sleeve 25 into a cone shaped pile 27 wherein the surface of the pile will be sloped downwardly from the sleeve in the chamber 15 according to the angle of repose of the particular feed that is being supplied. Once the feed pile 27 builds up to the outlet of the sleeve 25 it blocks further flow of feed from the delivery tube 19 and constitutes a self limiting supply mechanism without any moving parts. If part of the pile 27 is removed, as by an animal feeding, only sufficient feed will flow by gravity until the feed pile reestablishes itself below the outlet of the sleeve.

It can be seen that this is an important feature of the feeder because it regulates the amount of feed that may be present and exposed to the environment of the feeding pen at any particular time. The adjustment of the sleeve itself will permit a greater or lesser quantity of feed to constitute the pile 27 so that adequate feed can be accessible to an animal at each feed access port while minimizing the quantity exposed to the environment. If the sleeve is raised the height and volume of the terminal feed cone 27 will be increased and conversely lowering the sleeve 25 will reduce the amount of feed present in the feed cone 27 under static conditions. Coarse feed or fine feed each have different angles of repose and they likewise require different settings in order to establish the optimum quantities in the chamber 15.

The feed delivery tube 19 is sized to allow adequate flow and to avoid blockage that may be caused by lumps or large particles that may get into the feed, but otherwise will contain a relatively small volume of feed per unit of length. This means that the flow of feed through the pipes will be relatively large for a given consumption of feed as compared to a conventional feeder with a large standing hopper of feed.

Moreover, the fact that individual animals will feed from at least two sides of the same pile 27 also means that flow through the delivery tube will be greater than flow from a single feeding position of a conventional hopper-feeder. In addition the bottom of the delivery tube 19 remains closed by the accumulated feed even during feeding and thus is not as subject to blockage or bridging by moisture from the mouth and nose of animals, particularly in view of the way the feed is isolated by the tube and falls directly out and away from the outlet of the sleeve.

The smooth sloping sides of the trough and the constant replenishment of the feed pile with fresh feed keeps the feed fresh and palatable and minimizes any areas of dead space where uneaten feed can accumulate and spoil as it does in flat bottom feeders.

The delivery tube 19 extending as it does downwardly into the center of the chamber 15 midway between the feed access openings in addition to its feed supply and control function also serves as a barrier which separates an animal feeding in the feeding port 3 from an animal feeding in feeding port 5 from the same pile of feed. This is so because the outside diameter of the delivery tube 19 occupies so much of the central portion of the chamber 15 between the feeding ports that an animal cannot get its head through the small remaining openings. This function is aided because of the placement of the feeding ports which further restrict the positioning of an animals head inside the chamber 15. This feature serves a valuable function in that certain animals tend to be pugnacious in a feeding mode and may try to drive other feeding animals away. The tendency is frequently seen with respect to the "runt" of a litter even though there is plenty of feed for all.

The partitioning effect of the delivery tube 19 between the feeding ports operates both physically and visually and tends to allow each animal to keep its mind on consuming its own feed rather than driving away its neighbor. As far as the grower is concerned all energy consumed by animals in fighting is wasted and the infections and disease which may be caused by wounds, even of a minor nature, make it desirable to minimize the opportunity for fighting which is accomplished by the physical and visual separation which this feeder provides.

In FIG. 3 a front elevation view of a double unit feeder is shown. This illustrates how the basic units of FIG. 1 can be combined linearly along the axis 17 in order to provide more pairs of feeding ports. It should be recognized that the feeding ports are spaced uniformly along the side of the housing and are similar in size and location above the bottom contact line 29 but that they are arranged in pairs and each pair must have its own feed delivery tube. In FIG. 3 and the remaining figures the same reference numerals and names of the elements shown in FIG. 1 apply. A "prime" refers to a corresponding part in a replicate. A third feeding port 3' and a fourth feeding port 5' correspond to the feeding ports 3 and 5 of FIG. 1. FIG. 3 may be viewed as placing two of the basic units of FIG. 1 side-by-side in a single housing without the end 35 of the housing containing feeding ports 3 and 5 in FIG. 3 and without the end 33' of a housing containing feeding ports 3' and 5'. Parenthesis in the drawing around the ends 35 and 33' are meant to show where the ends would have been. The end 35' of FIG. 3 corresponds to the end 35 of FIG. 1. It may also be seen that additional basic units could be added to produce a longer feeder line although in most feeding pen situations a unit with four feeding ports is sufficient.

The very practical reason for eliminating the ends and making the unit from a single housing is that of economy. The plastic drain pipe which is a preferred material is available in long lengths which can be used for the housing, which reduces the requirement for labor and materials. A unitary housing is also more desirable because it maximizes the rigidity and strength of the unit which may be subjected to occasional impact stresses by animals in a pen.

The feed access ports 5 and 3' in FIG. 3 will not be separated with a partition unless a separate partition is added between them. This may be done by inserting a round piece of plain material inside the housing of FIG. 3 between feed access ports 5 and 3' and fastening it in place between them by brackets or by fasteners passing through the housing into the partition. While this may be done to insure the separation of a feeding animals at the place where two basic units are joined, it is not considered necessary because an animal at feeding port 5 necessarily feeds towards delivery tube 19 of FIG. 3 whereas an animal feeding at feeding port 3' necessarily feeds toward delivery tube 19' and thus they tend to feed oppositely away from each other which minimizes the tendency to conflict.

In the best mode where the animals are pigs of about 40 pounds on up to 150 pounds, the delivery tube 19 is made from a four inch diameter by 3/16 inch wall plastic pipe which is commonly available as a construction material used for stacks and drain pipe in residential construction. The housing 1 is preferably made from 12 inch diameter by ⅜ to ½ inch wall thickness plastic pipe which is commonly used as drain pipe. For pigs over 150 pounds, fifteen inch pipe should be used. The plastic materials from which these pipes are made is commonly known as PVC. Both of the pipes are common construction material which supply a good degree of rigidity with some resiliency as compared with concrete or metal and will last indefinitely without corrosion. They are easily drilled or cut and may be glued with special plastic adhesives.

The suggested size of the feeding ports is to have a horizontal dimension of about 9 inches wide and 11 inches long in the vertical direction along the wall, with the bottom edge 11 and 13 being about 5 inches above the bottom of the housing 1 so as to provide a suitable volume to hold feed in the trough 16 without spillage out of the chamber 15. This is a particular advantage of the invention because the limited opening in the chamber coupled with the limited feed pile 27 makes it difficult even for a vigorously feeding animal to throw feed out of the chamber onto the floor.

The clamp 39 is preferably a large diameter stainless steel hose clamp and the brackets 21 may be simple metal angles fastened by appropriate fasteners such as bolts or screws to securely hold them in position.

The feeder in the form so far described is primarily intended to be a feeder for use along the wall of a feeding pen and the dimensions of the feeding ports are those appropriate to raising pigs. The invention is not limited to growing pigs but is particularly appropriate therefore. The feeding ports should be sized for the animals to be fed to accommodate the head of the largest animal that will be expected to use the feeder without making the feeding ports so large as to permit the animals to enter the feeder.

In FIG. 4 an alternate form of the invention is illustrated in a plan view with front and rear side feeding ports. It corresponds to the basic unit of FIG. 1 and FIG. 2 and the nomenclature of those figures applies to FIG. 4. The housing 1 has a front side 41 and a rear side 43. Feeding ports 3 and 5 in the front side 41 are identical to those shown if FIG. 1. The housing 1 also has a rear feeding port 45 which is directly opposite and in mirror image relation to the feeding port 3 about a vertical plane through the center line axis of the section 5—5. The housing 1 also has a rear feeding port 47 which is directly opposite and in mirror image relationship to the feeding port 5 about the same vertical plane just described.

Centered between and among the respective feeding ports 3, 5, 45 and 47 is the delivery tube 19 and sleeve 25. The approximate perimeter of a feed pile 27 is illustrated generally centered in the enclosed chamber 15 inside the housing 1. Vertical partitions 49 are shown extending partially downward from the top of the enclosure 15 inside the housing 1 midway between each of the pairs of oppositely situated feeding ports 3 and 45 and the ports 5 and 47.

FIG. 5 is a vertical elevation section 5—5 of FIG. 4 which more clearly shows the arrangement and position of the partial partitions 49 which are shown in FIG. 4. Brackets 51 fix the respective partitions 49 in position in the chamber 15 as shown in FIG. 4 and FIG. 5. They may be of any particular length to accomplish their partial partitioning function.

It is evident that the alternate form of the invention shown in FIG. 4 is essentially the same as the invention shown in FIG. 1 with the addition of the opposite but identical feeding ports 45 and 47 and the vertical partial partitions 49 with their corresponding installation brackets 51. It is also evident that multiple units like those shown in FIG. 4 may be combined along the longitudinal axis corresponding to the axis of the section line 5—5 in the same manner as the basic unit of FIG. 1 was combined, in FIG. 3 to provide additional pairs of feed access ports. All of the comments applicable to the combination of the basic units of FIG. 1 to form multiple basic units illustrated in FIG. 3 are applicable to the basic unit of FIG. 4 except that the basic unit of FIG. 4 has four symmetrical feed access ports for each feed delivery tube and its corresponding feed pile.

The modification of FIG. 4 is particularly suited for installation as a fence line feeder between two adjacent animal holding and feeding pens. In such an installation the plane of the fence would split the housing 1 along the line represented by the axis of the section line 5—5. The front side of the housing 41 along with the feed access ports 3 and 5 would extend into the space of one feeding pen while the rear side 43 and the corresponding rear feed access ports 45 and 47 would extend into the space of an adjacent pen where the fence line between the pens is a common boundary. The fence line referred to in FIG. 4 would correspond to a vertical plane through the lines 31, 17 and 29 of FIG. 1. Thus the animals in one pen would have access only to the feeding ports in the front side and the animals in the other pen would have access only to the feeding ports in the rear side. The basic units can be replicated longitudinally along the fence line to provide additional feeding ports in each of the pens.

The fence line feeding arrangement of FIG. 4 further minimizes the amount the floor space occupied by the compact feeder illustrated in FIG. 1 and FIG. 3 because in the feeder of FIG. 4 approximately half of the feeder is in each of the two pens. Furthermore since there are twice as many feed access ports in the modified feeder of FIG. 4 the number of animals that can feed simultaneously is doubled.

Thus for a given number of required feed access ports it is possible to reduce the number of compact feeders required by half of the number of feeders that would be required if a separate one side feeder were placed along the sidewall in each pen. This can reduce the installation cost substantially because it is only necessary to provide the additional access ports and partitions between each pair of oppositely arranged feeding ports such as 3 and 45.

The partitions 49 have the effect of minimizing visual and physical contact between animals feeding simultaneously from opposite sides of the housing and also to prevent the smaller animals from one pen to get into the chamber 15 to cross over from one pen to another pen by going through the feeder, as by entering feeding port 3 and exiting feeding port 45. This prevents undesirable mixing of animals from one pen into another pen.

Because the vertical partitions 49 are disposed at the center of the chamber 15 there is still room for the animal to feed. The partitions 49 need extend downwardly no more than to about the center line of the chamber 15.

The modified feeder of FIG. 4 can also be utilized in a single pen by placing it away from the wall of the pen to provide feeding from both front and rear which permits the utilization of a shorter housing for a given number of feed access ports with economies of space and required materials over that required for conventional feeders. This also has the effect of reducing the number of delivery tubes required and the attendant connections with the feed supply system.

An alternate embodiment has a housing which when viewed from an end in cross section is teardrop shaped. Only the housing and housing ends are modified and all the other parts remain the same as previously described, and the feeder accomplishes the same function.

The modified housing of the alternative embodiment still has the rounded bottom portion which constitutes a trough but a portion of the sides between the bottom and the top is flat. The portion referred to includes at least in part the feed access openings. The flat portion of one or both sides is spaced farther apart at the bottom than at the top as in a triangle or triangular shaped tube with an apex at the top. The top of the triangle shape may be slightly truncated to allow room for connection and passage of the feed delivery tube or tubes. This feeder will sit a little closer to a wall and may make it slightly easier for the animals to reach the feed in the center of the rounded bottom trough.

Although particular embodiments of the invention have been illustrated in the accompanying drawings as described in the foregoing detailed description it will be understood that the invention is not limited to the embodiments disclosed, but may be subject to rearrangements, modifications and substitutions of parts and elements without departing from the spirit of the invention.

What is claimed is:

1. An animal feeding trough comprising, in combination, an elongate feeder housing with a longitudinal central axis, having a wall enclosing a feeding chamber, said housing having a top bounded by a top line and a bottom bounded by a bottom line, both lines being parallel to the central axis and lying in the same plane; the housing wall having a rounded front side and a rounded rear side opposite each other between the top and bottom boundary lines, said wall having a feed opening midway along the top boundary line and a pair of longitudinally spaced access openings in a sidewall defining a pair of feeding ports and providing feeding access to said chamber, said feeding ports having a lower edge above the chamber bottom so that the rounded bottom of the chamber serves as a feed holding trough; and feed delivery means coupled to said housing and extending through said feed opening below the central axis a spaced distance above the chamber bottom for discharging animal feed into the middle of the feeding chamber trough midway between the feeding ports, said feed delivery means including barrier means in the chamber between said feeding ports to restrict physical or visual contact between animals feeding at adjacent ports.

2. The feeder of claim 1 which further includes a sleeve means mounted adjustably and fixedly on the lower end of the feed delivery means to provide an adjustable outlet to vary the spaced distance between the outlet and the chamber bottom.

3. The feeder of claim 2 in which the feed delivery means is further defined as a feed delivery tube having a portion which extends upwardly away from the chamber having a connection for a feed supply, the upwardly extending portion being in line with a portion of the feed delivery tube extending into the chamber, wherein the inwardly extending portion of the feed delivery tube and the sleeve mounted thereon are centered between the ports and occupy a sufficient portion of the chamber as to constitute the barrier means in the chamber.

4. An animal feeding trough comprising in combination, an elongate feeder housing with a longitudinal central axis having a wall enclosing a feeding chamber, said housing having a top bounded by a top line and a bottom bounded by a bottom line both parallel to the central axis and lying in the same plane, said housing having a rounded front side and a rounded rear side opposite each other between the top and bottom lines, said wall having at least two feed openings spaced apart along the top line, and a pair of openings in one side wall for each feed opening, said openings defining longitudinally spaced feeding ports providing feeding access to said chamber wherein a feeding port of each pair is located on either side of a corresponding feed opening, said feeding ports having a lower edge in the sidewall above the bottom line of the chamber so that the rounded bottom of the chamber defines a feeding trough;

a feed delivery means for each feed opening coupled to said housing, said means having an outwardly extending portion with a connection for a feed supply outwardly of said housing and having an inwardly extending portion extending through said feed opening below the central axis a spaced distance above the chamber bottom, for discharging feed into the trough between a pair of feeding ports said feed delivery means including an adjustable means having an outlet for varying the spaced distance below the outlet and including barrier means in the chamber between said feeding ports for physically and visually restricting contact between adjacent animals feeding at each corresponding pair of feeding ports.

5. The animal feeder of claim 4 wherein the feed delivery means is further defined as a feed delivery tube extending upwardly through each feed opening along a line passing through the central axis, to a connection for a feed supply, and extending inwardly into the feeding chamber along said line and having a lower portion below the center of the chamber having a tube outlet wherein the adjustable means is a slideable sleeve mounted on the lower portion of the delivery tube for adjusting the spaced distance between the outlet of the adjustable sleeve and the bottom of the chamber in order to control the amount of feed that may be contained in the feed pile in the trough under the feed delivery tube, said sleeve also including fastening means for fixing the sleeve in place on the delivery tube.

6. The feeder of claim 5 wherein the barrier means is further defined as the inwardly extending portion of the delivery tube inside the chamber and the sleeve mounted thereon which occupy a sufficient space in the center of the chamber between each pair of ports so as to serve as a barrier extending from the top of the chamber to the outlet of the adjustable sleeve.

7. An animal feeding trough comprising, in combination an elongate housing having a wall enclosing a feeding chamber, said housing having a rounded bottom trough, a front side, a rear side opposite said front side and a top, said housing having at least one feed opening in the top;

said housing also having at least one pair of laterally spaced openings in the front side and in the rear side, opposite each other, said openings defining feeding ports and providing feeding access to said chamber;

feed delivery means for each feed opening coupled to said housing and passing through said feed opening for discharging animal feed from a source of feed in a pile in the feeding chamber trough at a location centered among opposite pairs of said front and rear feeding ports, including means for adjusting the size of the feed pile and barrier means centered in the enclosure for separating and preventing contact between animals feeding adjacently from the same side at a pair of feeding ports; and said housing having mounted therein partial partition means between opposite ports for limiting contact between oppositely feeding animals.

8. The animal feeder of claim 7 wherein the feed delivery means is further defined as a feed delivery tube extending upwardly through each feed opening on a line passing through the central axis, to a connection for a feed supply, and extending downwardly into the feeding chamber on said line and having a tube outlet below the center of the chamber through which feed can pass into the chamber.

9. The animal feeder of claim 7 wherein the means for adjusting the size of the feed pile is a slideable sleeve mounted on the lower portion of the delivery tube, said sleeve having an outlet, wherein the adjustment of said sleeve adjusts the spaced distance between the outlet of the adjustable sleeve and the bottom of the chamber in order to control the amount of feed that may be contained in the feed pile in the trough under the feed delivery tube, said sleeve also including fastening means for fixing the sleeve in place on a delivery tube.

10. The feeder of claim 9 wherein the barrier means is further defined as the downwardly extending portion of the delivery tube inside the chamber and the sleeve mounted thereon located in the center of the chamber between each pair of ports so as to serve as a barrier extending from the top of the chamber to the bottom of the adjustable sleeve.

* * * * *